United States Patent [19]

Marchesi et al.

[11] Patent Number: 5,973,288
[45] Date of Patent: Oct. 26, 1999

[54] METHOD AND APPARATUS FOR CONTROLLING SPARK EROSION PROCESS

[75] Inventors: Alberto Marchesi, Gordevio; Marco Boccadoro, Broghirolo, both of Switzerland

[73] Assignee: Agie SA, Losone, Switzerland

[21] Appl. No.: 08/550,579

[22] Filed: Oct. 31, 1995

[30] Foreign Application Priority Data

Nov. 17, 1994 [DE] Germany .............................. 44 41 055

[51] Int. Cl.$^6$ .............................. B23H 7/20; B23H 7/14
[52] U.S. Cl. ........................................................ 219/69.13
[58] Field of Search .............................. 219/69.13, 69.16, 219/69.19, 69.17

[56] References Cited

U.S. PATENT DOCUMENTS

| | | | |
|---|---|---|---|
| 3,739,136 | 6/1973 | Marendaz ............................. | 219/69.13 |
| 3,975,607 | 8/1976 | Ullmann et al. ...................... | 219/69.13 |
| 4,185,184 | 1/1980 | Pfau ..................................... | 219/69.13 |
| 4,361,745 | 11/1982 | Rupert et al. ......................... | 219/69.13 |
| 4,484,051 | 11/1984 | Yamada et al. ....................... | 219/69.13 |
| 4,606,007 | 8/1986 | Inoue ................................... | 219/69.16 |
| 4,700,039 | 10/1987 | Konno et al. ......................... | 219/69.16 |
| 4,760,233 | 7/1988 | Obara ................................... | 219/69.16 |
| 4,970,363 | 11/1990 | Obara ................................... | 219/69.17 |
| 5,360,957 | 11/1994 | Haefner et al. ...................... | 219/69.13 |
| 5,410,118 | 4/1995 | Boccadoro ............................ | 219/69.13 |
| 5,589,086 | 12/1996 | Sawada et al. ....................... | 219/69.16 |
| 5,637,240 | 6/1997 | Izumiya et al. ...................... | 219/69.13 |

FOREIGN PATENT DOCUMENTS

| | | |
|---|---|---|
| 57-75727 | 5/1982 | Japan . |
| 59-53124 | 3/1984 | Japan . |
| 2-59239 | 2/1990 | Japan . |

OTHER PUBLICATIONS

Abridged English language translation of Japanese Patent Appln. Publication No. 57–75,727, No Publication Date.
Abridged English language translation of Japanese Patent Appln. Publication No. 59–53124, No Publication Date.
English translation of Japanese Office Action citing JP OS 2–592239. No Publication Date of Japanese Office Action.
Derwent Abstract corresponding to 59–53124.
Derwent Abstract corresponding to 57–75,727.

*Primary Examiner*—Geoffrey S. Evans
*Attorney, Agent, or Firm*—Darby & Darby

[57] ABSTRACT

A method and an apparatus for controlling a spark erosion process between a workpiece and an electrode for instance a microdrilling electrode, so that the erosion process becomes less susceptible to a malfunction, in that at least one process parameter is measured along a first test interval of the section to be eroded, at least one control value is deduced form the measured values, and this control value is used in a subsequent erosion interval of the section to be eroded. The control value is preferably used for controlling a suitable feed rate of the electrode. The susceptibility to malfunctions is further lessened, in that a differentiation is made between mechanical and other short circuits and in that the electrode movement is controlled differently for mechanical short circuits than for other short circuits.

18 Claims, 5 Drawing Sheets

METHOD AND APPARATUS FOR CONTROLLING SPARK EROSION PROCESS

BACKGROUND OF THE INVENTION

1. Field of the Invention

The present invention relates to a process and an apparatus for controlling spark erosion processes, i.e. of cutting and vertical erosion processes.

Spark erosion processes are used for machining of electrically conductive workpieces with high precision by means of electrodes. The resulting shape of the workpiece is determined by various factors, like the shape of the electrodes, the machining force, etc. A preferably constant and stable response of the working electrode as well as an accurate position and movement control are required for obtaining a high quality during machining, specifically for setting the proper precision; it is particularly important to maintain the distance between the electrode and the section of the workpiece which is to be machined, as accurate as possible, subject to the desired process conditions; and also the corresponding machining time and machining intensity. This causes problems particularly with extremely thin and flexible electrodes of the kind which are used in the field of microerosion, for instance for microdrilling. Problems arise especially in the area of handling of malfunctions, like short circuits.

2. Description of the Related Art

CH-PS-525 061 (KONDO) describes in general the basis for the automatic control of spark erosion processes. These comprise, in particular, sensing means for measuring voltages and currents, a logic circuit for processing the measured information and control means, hereby controlling the spark erosion processes. The movement of the electrode occurs in relation to the actual conductivity of the gap (i.e. the conductivity in the dielectric between the electrode and the workpiece) by means of a servo mechanism. Malfunctions, like short circuits or arcing, are corrected, among others, by limiting the short circuit current and by moving the electrode away from the workpiece.

EP-A-0 333 170 (AGIE) and U.S. Pat. No. 4,864,091 compare a desired distance which corresponds to the present processing conditions for machining the workpiece, with the actual distance between the working electrode and the workpiece. An error signal is computed by comparing these two values, and this error signal is transmitted by means of a low-pass filter circuit to a control circuit for moving the electrode. The actual distance is preferably determined from the present erosion voltage.

U.S. Pat. No. 5,159,167 (CHAIKIN et al.) refers to, among other things, the control of the position of an electrode by means of spark sensors and to a precise control of the hole size by means of a "complete" control of the electrical discharge.

DE 32 04 799 A1 (YAMADA et al.) refers to an apparatus for machining workpieces by electrical discharge, where the apparatus switches off automatically at the "end of a machining process", i.e., exactly at the moment when the electrode has penetrated the workpiece.

DE 33 00 552 C2 (GARBAJS et al.) teaches, in principle, a method for controlling a process for machining by means of spark erosion, whereby the discharge pulses which are present in the gap between a tool and the workpiece to be machined, are detected and their characteristic voltage profile is analyzed. Furthermore, the distinction is made between abnormal discharges and short circuit pulses due to galvanic short circuits, causing the machine to respond differently.

In many situations, these known apparatuses and/or methods are unable to react adequately to sudden changes in the erosion conditions, for instance to the sudden changes which occur when a microdrilling electrode passes through the underside of the workpiece. When this happens, the flushing fluid for the erosion can escape through the underside, or, in more general terms, can flow through the workpiece. This causes a drastic change in the flushing pressure, the flushing speed and the direction of motion of the flushing fluid. Consequently, the position of the electrode will be unstable, gas bubbles will form in the drilled cavity, and the particles which were already eroded, if they are still within the drilled cavity, will change their direction of motion and will be flushed downwards. This will lead to "non-mechanical" and "other" short circuits, abrupt variations in the voltage and errors in the measured control values, since the voltage across the gap looses its customary meaning (proportional to the gap width). The known control systems reacts in this situation by rapidly retracting the electrode, whereby the instability in the machining process is enhanced or the process terminated, regardless if the actual results correspond to the desired results or not. The first situation in particular will lead to an increased residence time of the electrode in the exit area of the drilled hole. Since the known methods and/or apparatuses are not able to take this extreme situation as such into account, erosion pulses will continue to be emitted during the instability phase, whereby the hole diameter increases in an irregular, undesirable, and uncontrollable fashion.

SUMMARY OF THE INVENTION

It is the object of the present invention to render the spark erosion process less susceptible to malfunction. Thus, the invention provides for a method for controlling at least one spark erosion process between at least one workpiece and at least one electrode, in particular a microdrilling electrode, whereby values of at least one process parameter are recorded in at least one region of a path to be eroded. From the measured values of at least one process parameter, one or several control values are determined (analogue or subsequently) which are then used, at least in part, in at least one later erosion region for controlling the spark erosion process. The invention also provides for a corresponding apparatus, comprising drive means and drive control means for providing relative movement between at least one workpiece and an electrode, generator means for generating erosion sparks, means for measuring values of process parameters, means for converting such measured values into control values, and storage means. Hereby, the means for measuring values of process parameters record values for at least one process parameter in at least one region of a section to be eroded. One or several control values are deduced from measured values of at least one process parameter by the means for converting such measured values into control values. The storage means store the resulting control values and the drive control means use these control values, at least in part, for the control of at least one subsequent erosion step.

An erosion machine which is based on such a method and such an apparatus, respectively, can independently determine control parameters for running an erosion process rather easily and without the intervention of an operator, making the operation less susceptible to malfunction. This can occur either over a specifically designated test path or over a section on a path which will be eroded. Characteristic data for an arbitrary workpiece-electrode combination can thus be determined automatically for different operating parameters. The data found by this method can be used for the "measured test piece" as well as for an arbitrary number of similar workpieces. This makes it possible to select suitable control values already during the exploratory phase, thus eliminating malfunctions to a large extent.

In a preferred embodiment, at least one of the determined control values contains a feed rate (forward velocity) for the electrode(s) which is suitable for the intended processing of the workpiece. Preferably, this feed rate is smaller than the average feed rate in the measurement region, and this feed rate is determined by multiplying the average feed rate in the measurement region with a coefficient which is less than one and which is preferably a function of the ratio (electrode diameter)/(thickness of the workpiece). In another preferred embodiment of the invention, the electrode moves over at least one section which follows the measurement section, in particular the final section, at the determined feed rate at least during the time period, when no short circuit occurs.

The advantages of these preferred embodiments are evident from the following situations: Rapid movement of the electrode in particular causes "mechanical" short circuits due to direct contact between the electrode and the workpiece. Therefore, the electrode will have to be retracted regularly in the measurement section after short circuits—as is practiced in the present state-of-the-art. If, however, a suitable feed rate is established simultaneously, the "safe" velocity makes it possible to prevent such "mechanical" short circuits in all sections following the measurement section. This results in an erosion process which is significantly less frequently interrupted and therefore more precise. The various advantageous results are evident from the different embodiments presented here. Furthermore, the invention enables an operator in a particularly straightforward and, at the same time, expert fashion.

The claims provide a method, wherein short circuits are classified as mechanical and as others, and wherein the electrode movement for mechanical short circuits is controlled differently from the movement for other short circuits. The claims also provide an apparatus for implementing the method, the apparatus comprising means for measuring values of process parameters and means for converting such measured values into control values and control signals, respectively. Hereby, the means for measuring the values of process parameters are measuring values which are significant, if short circuits occur. Based on the measured values, the means for converting measured values into control values distinguish between mechanical short circuits and other short circuits and provide different control values and control signals, respectively, for mechanical short circuits than for other short circuits.

Non-mechanical short circuits, for instance, can be caused by particles in the flushing fluid which have already been eroded. Since these particles are flushed away rapidly, it makes sense to treat this short circuit situation differently from mechanical short circuits. In particular, differentiated treatment of short circuits makes it possible to maintain an almost uninterrupted erosion operation. In particular, by combining a "safe" feed rate with this differentiated treatment of short circuits, malfunctions during the erosion operation can be reduced with notable efficiency.

The differentiation between mechanical and other short circuits is preferably made on the basis of the short circuit voltage and/or the duration of the short circuit, whereby the threshold value for the short circuit should preferably be a function of the ratio (electrode diameter)/(thickness of the workpiece). (In comparison, mechanical short circuits have a longer duration and a smaller voltage.) During a mechanical short circuit, the electrode is preferably moved backward with constant velocity, whereas otherwise, especially during a short circuit caused by other reasons, it moves forward with a feed rate Va. (As soon as a mechanical short circuit is over, the electrode will move forward again with Va). Hereby, the reverse velocity is preferably greater than the feed rate.

Such embodiments of the invention enable, in a rather simple fashion, a differentiated approach to short circuits. Reactions can be flexible and any additional malfunctions from these reactions can be minimized. In particular, the aforementioned short circuits which occur at the exit of the drilled hole in microdrilling and which are not—as outlined above—of a mechanical nature, do no longer lead to an instability phase or to a reduced precision.

In another preferred embodiment of the invention, the section to be eroded is divided into exactly two sections, whereby one of these sections is (also) used to determine one or more control values, particularly to determine the feed rate for the spark erosion process in the other section, whereby the ratio between the first and the second sections is a function of the ratio (electrode diameter)/(thickness of the workpiece).

This method assures a particularly simple operation of the erosion machine: for microholes drilled through workpieces, the operator only enters the electrode diameter and the thickness of the workpiece in order to establish the entire erosion process. In another preferred embodiment of the invention, the electrode is selected for the microdrilling, and the hole diameter is controlled via a feed rate Vb, which must not be greater than Va and which is determined for the corresponding hole diameter according to the formula $Vb = kd*Ni*kk*4/(pi*D*D)$, whereby

| | |
|---|---|
| Ni = | number of discharges per unit time |
| D = | desired hole diameter (= 2*sqrt(A/pi)) |
| A = | corresponding area (kd*Ni*kk/Vb) |
| kd = | removal coefficient = removed volume per discharge |
| kk = | effective coefficient = ratio of the number of short circuits to the number of discharges |
| pi = | 3.1415 . . . |
| sqrt = | square root |
| Vb = | feed rate. |

For each machining task, kd is determined experimentally. Ni and kk can be determined from the measurement in one section, provided that not only the average feed rate, but also the number of discharges per unit time and the ratio of the number of short circuits to the number of pulses per unit time is measured and averaged.

In this way, it is possible to drill any number of microholes with high precision, using a limited number of electrode diameters. This is the case, because the diameter of a spark erosion microhole is a function of the energy supplied to the arc gap for the removal of material. For constant power, this becomes a function of the dwell time of the electrode at the corresponding drilling site and hence a function of the feed rate Vb. According to the invention, this assures at the same time that an erosion process is largely free from malfunctions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

As shown in the figures, a spark erosion machine according to the invention machines a workpiece 7 in at least two sections. It is hereby essential that in at least one section, one or more control values for the spark erosion process are determined and applied in at least one other section. It would also be possible to check the determined control values, for instance, in an additional intermediate section. Preferably, however, the entire erosion section is divided into only two sections, which will hereafter be called measurement section and initial section. The ratio of the lengths of these two sections is characterized by the coefficient Ks. (Therefore: Ms=(1−Ks)*S and As=Ks*S, respectively, with Ms=measurement section, As=initial section, and S=total section to be eroded or thickness or the workpiece, respectively). In the measurement section, the spark erosion machine operates essentially according to known processes and by means of known apparatuses. Hereby—as shown as an example in FIG. 1—a known servo system 2 in cooperation with a drive 4 and a motor 4a controls the position of an electrode 6 in relation to a workpiece 7. A generator 8 supplies erosion pulses. A measurement circuit 3 analyses the gap and arc voltage and supplies control signals to the servo system 2. An encoder supplies information about the position of the electrode 6 to a numerical control 9. The numerical control 9 calculates the feed rate and, based on input from the operator, the ratio (electrode diameter)/(thickness of the workpiece), the multiplication coefficient Ka, the section ratio coefficient Ks, a threshold Dkm for the duration of a short circuit, and a comparator threshold Kza. In addition, during the machining of the measurement section, the number of discharges per unit time and the number of short circuits in relation to the number of pulses per unit time are measured and averaged together with the feed rate. The averaged feed rate is multiplied by a coefficient Ka which has a value smaller than 1. The resulting velocity is called initial velocity Va. In addition, the numerical control 9 determines a reverse velocity Vr which is greater than Va.

Figure 1:
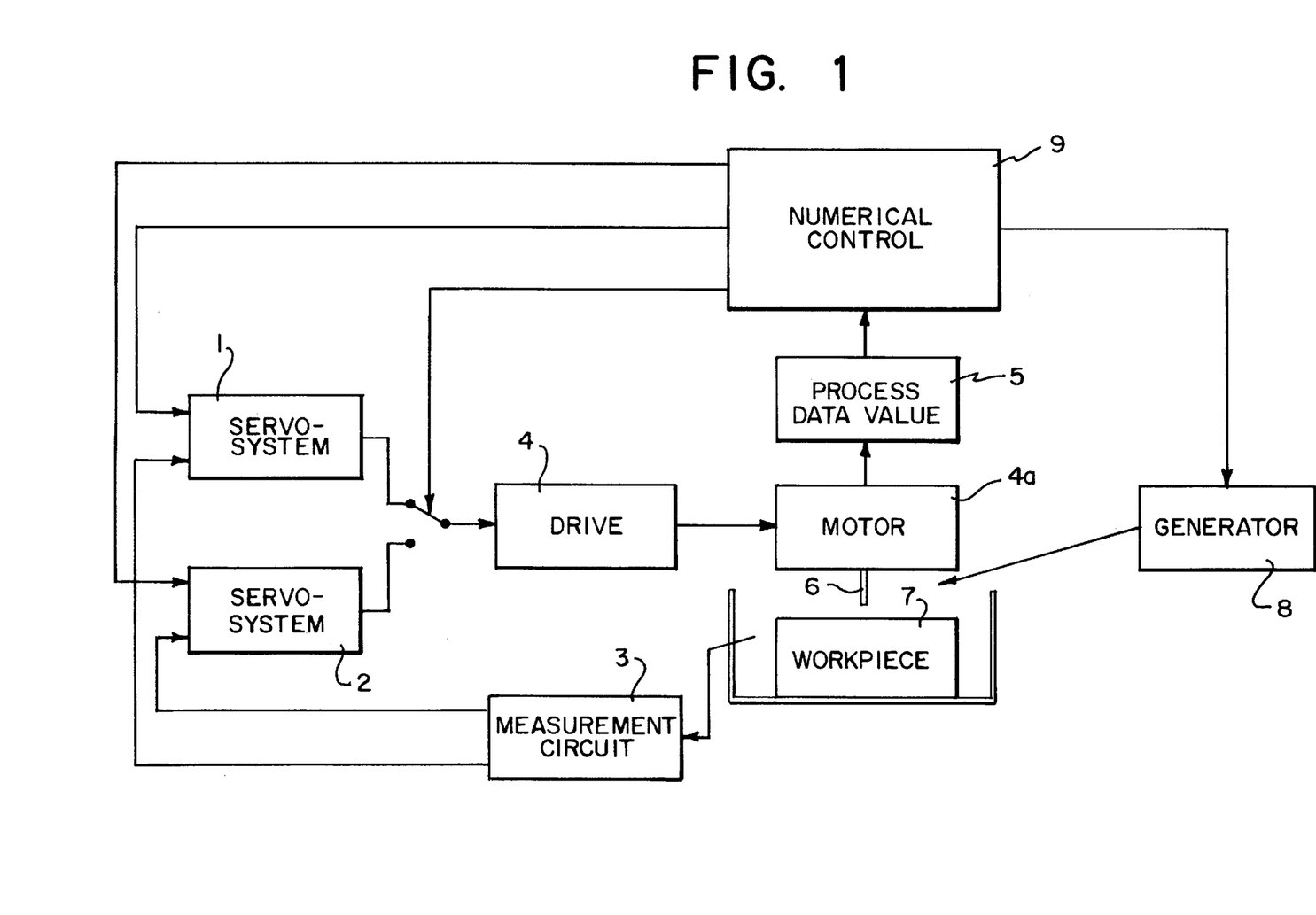
FIG. 1 illustrates a block diagram of an example of an erosion machine according to the invention.

The numerical control 9 transmits the control values Vr, Va, Dkm, Kza, which were determined in the measurement section, to a special servo system 1. When the boundary between the measurement section and the initial section is reached, the numerical control replaces the control signal connection between the known servo system 2 and drive 4 by a connection between the special servo system 1 and drive 4, whereby the control of the electrode position is assumed by the apparatus 1 according to the invention. Alternately, instead of using the apparatus described hereafter, the method according to the invention can also be implemented by means of one or more general-purpose computers which are programmed accordingly. There exists also the possibility to combine the servo system 1 and/or the control system 2 and/or the numerical control 9, for instance, in such a general-purpose computer. However, in this case, a fast processor is required, since the response time of the circuit has to be very short.

Figure 2:
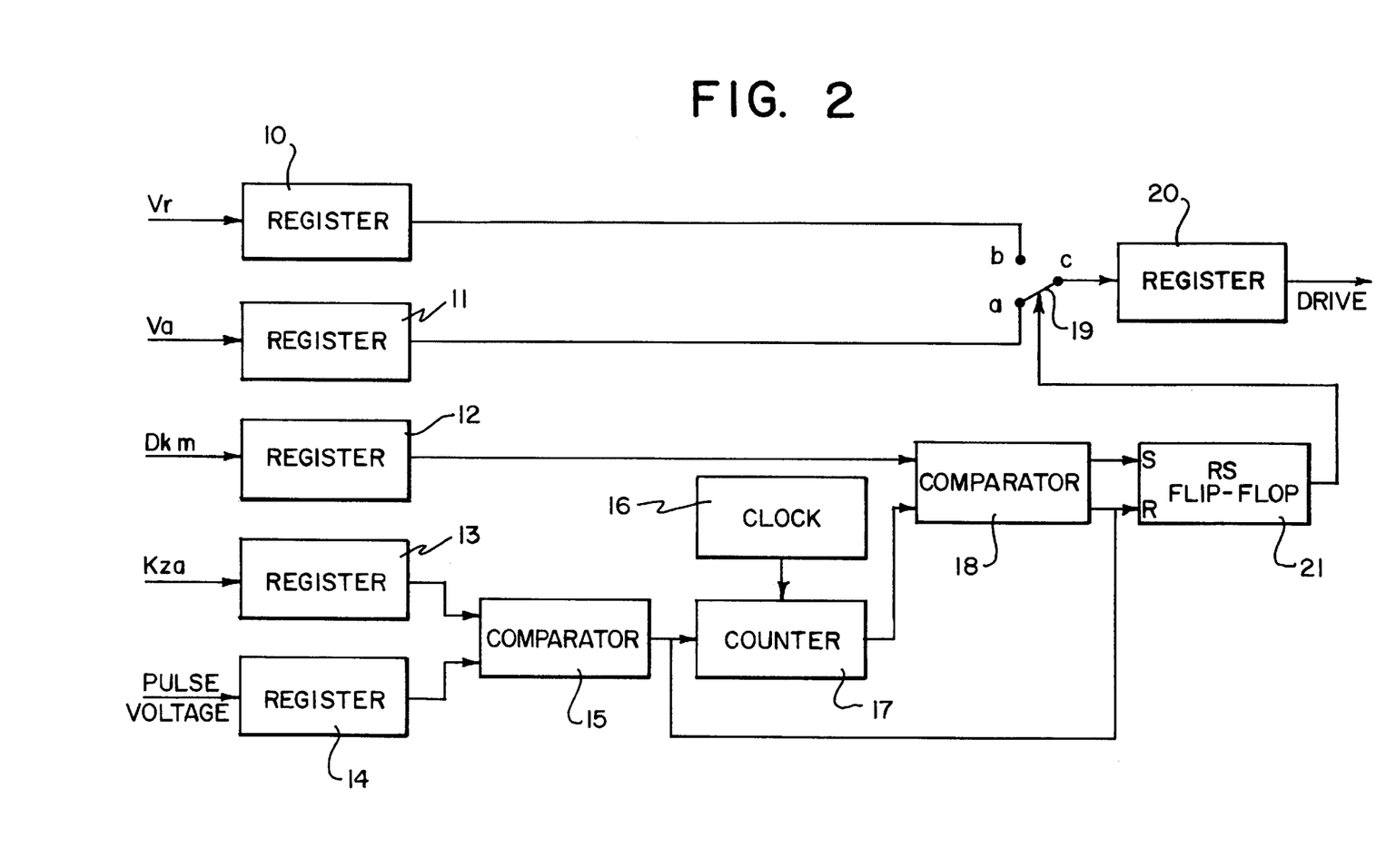
FIG. 2 is a more detailed representation of a part of an erosion machine according to the invention.

The special servo system 1 is shown in detail in FIG. 2. The forward velocity (Va) and reverse velocity (Vr) are stored in registers 11 and 10, respectively. A data selector 19 is initially in position ac, and remains in this position as long as the RS-flip-flop 21 does not change its state, i.e., as long as no serious mechanical short circuits are detected. In order to make this decision, the pulse voltage is stored in a register 14 and the amplitude of the pulse voltage is compared to the threshold Kza in a comparator 15, and the duration of the short circuits are summed in a counter 17 proportionate to a clock 16. The short circuit duration so determined is then compared to the threshold value Dkm for the short circuit duration by means of a preferably digital comparator 18. If the short circuit duration is longer than the duration preset by the threshold value Dkm, then the RS-flip-flop 21 is triggered, and the data selector 19 supplies a reverse velocity Vr to a register 20. This reverse register stores Vr and transmits Vr to the drive 4. Subsequently, the electrode 6 moves backwards. When the short circuit is removed, the RS-flip-flop 21 changes its state, and the electrode moves again forward with the velocity Va.

Figure 3:
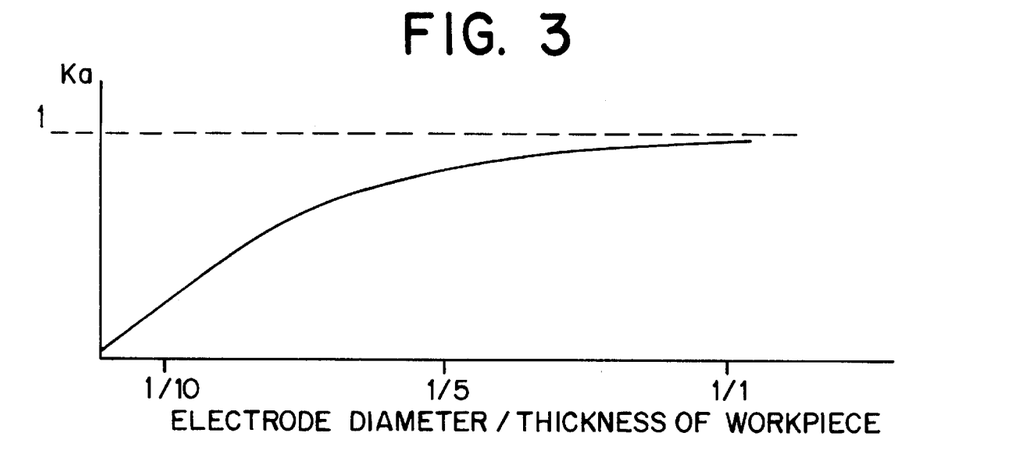
FIG. 3 is a graph of the multiplication factor Ka as a function of the ratio (electrode diameter)/(thickness of the workpiece)

FIG. 3 shows a graph of the multiplication coefficient Ka as a function of the ratio (electrode diameter)/(thickness of the workpiece). For deep microholes, the coefficient has to be smaller than for less deep microholes, because here the flushing ratios deteriorate. The multiplication coefficient Ka represent a relative upper limit of the feed rate Va. Velocities less than Va offer, as outlined above, additional options for controlling the hole diameter.

Figure 4:
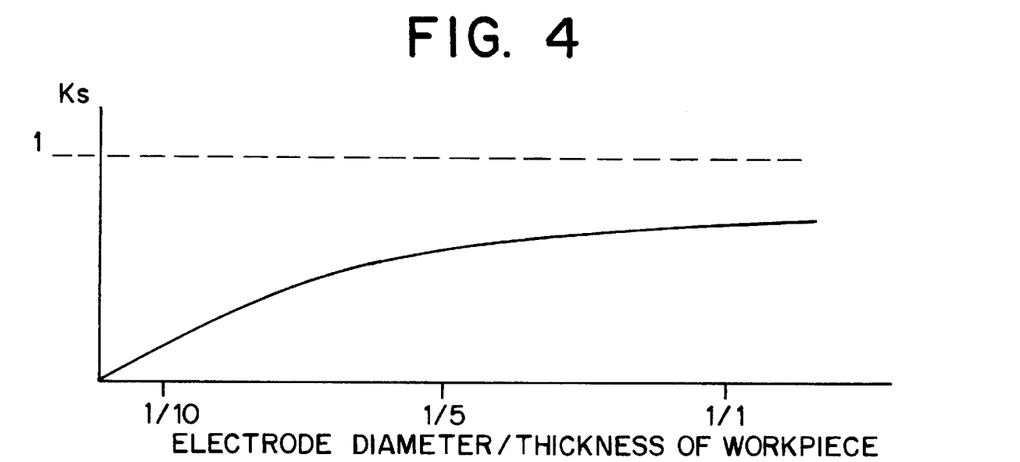
FIG. 4 is a graph of the coefficient Ks as a function of the ratio (electrode diameter)/(thickness of the workpiece)

FIG. 4 shows a graph of the coefficient Ks as a function of the ratio (electrode diameter)/(thickness of the workpiece). For deep microholes, this coefficient has to be smaller than for less deep holes for the same reasons as Ka. For a ratio (electrode diameter)/(thickness of the workpiece) :=V=1/10, good results were obtained with, for instance, Ks=0.1.

Figure 5:
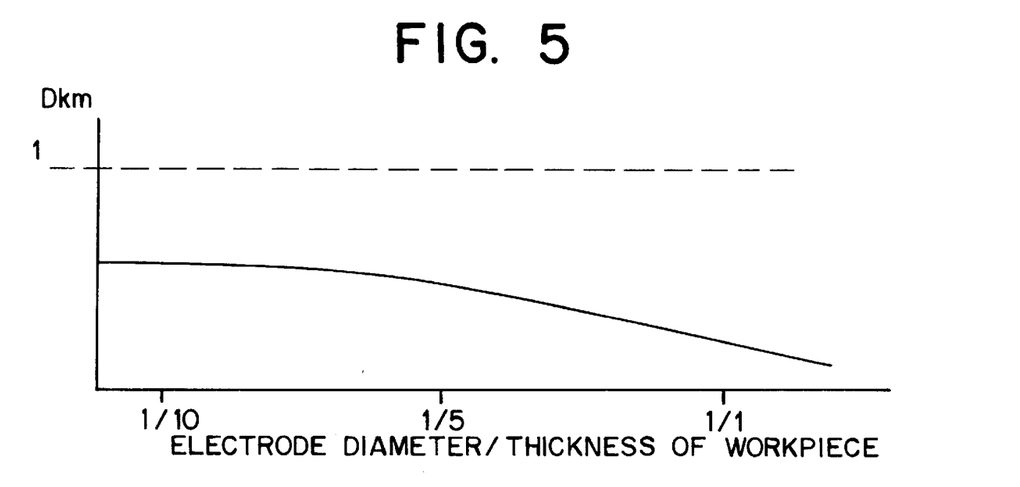
FIG. 5 is a graph of the threshold value Dkm for the duration of the short circuit as a function of the ratio (electrode diameter)/(thickness of the workpiece)

FIG. 5 shows a graph of the threshold value Dkm for the duration of the short circuit as a function of the ratio (electrode diameter)/(thickness of the workpiece). For deep microholes, the coefficient has to be larger than for less deep microholes, because the poorer flushing conditions cause the erosion process to become less stable. For V=1/10, for instance, good results were obtained with Dkm=0.6.

Figure 6:
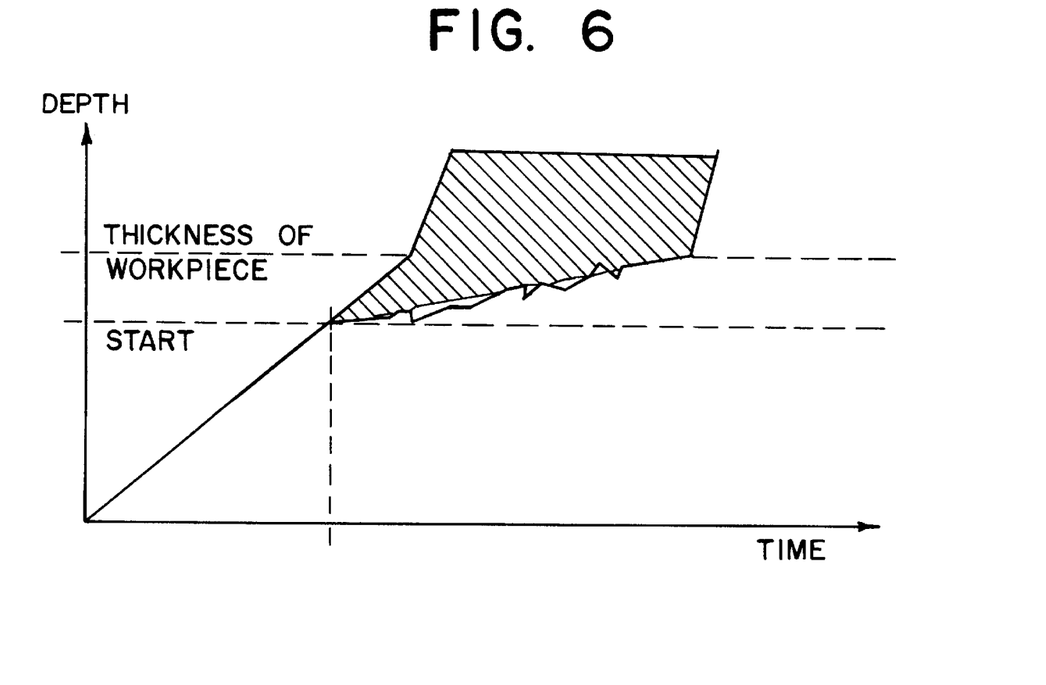
FIG. 6 is a graph of the time dependence of the electrode position for a spark erosion microdrilling using known control methods.

FIG. 6 shows a graph of the time dependence of the electrode position for a spark erosion microdrilling using known control methods or without using an apparatus according to the invention. The hatched area represents the scatter of the process at penetration of the workpiece, i.e. the results lie in this region during batch processing.

Figure 7:
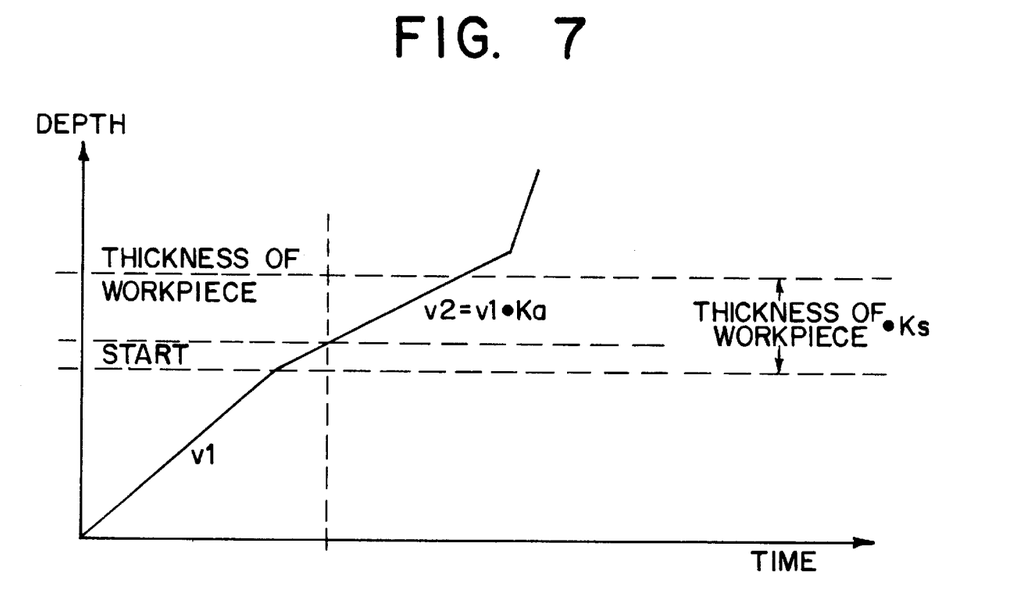
FIG. 7 is a graph of the time dependence of the electrode position for a spark erosion microdrilling using an erosion machine according to the invention.

FIG. 7 shows a graph of the time dependence of the electrode position for a spark erosion microdrilling using an apparatus according to the invention. The machining process during repeated experiments is always constant and reproducible.

Figure 8:
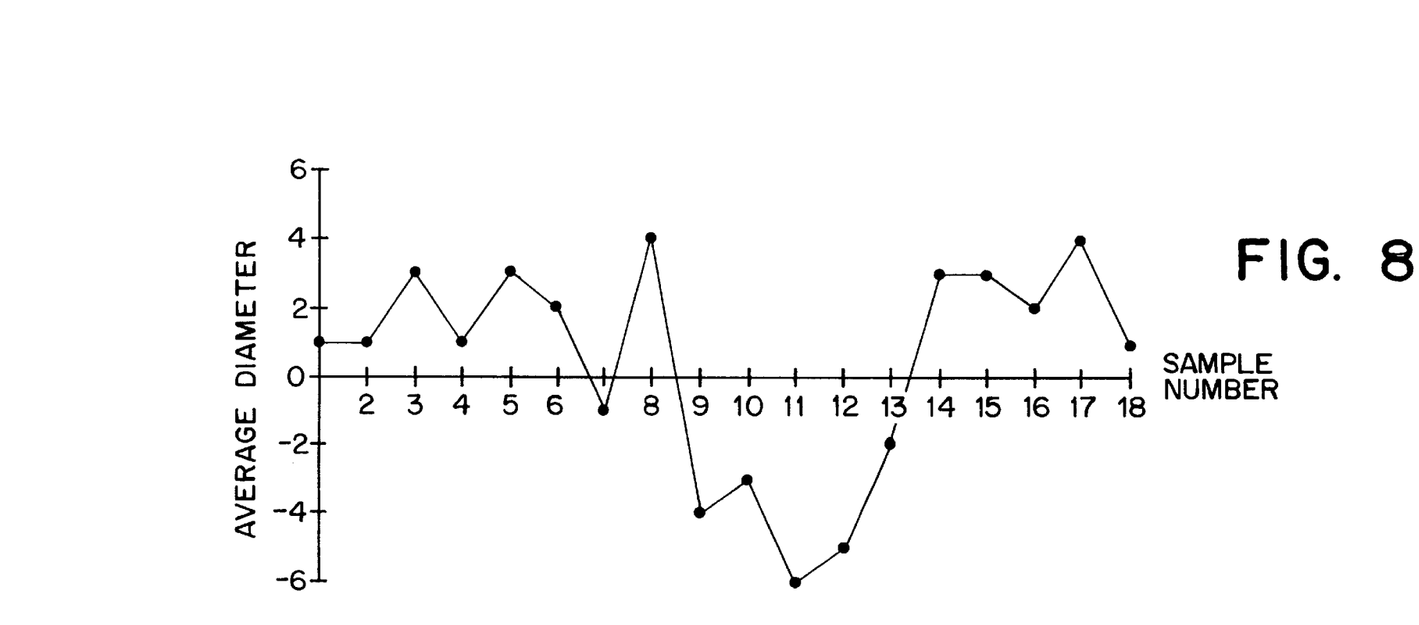
FIG. 8 is a representation of the distribution of initial hole diameters during batch machining of 18 microholes using known control methods.

FIG. 8 shows a representation of the distribution of initial hole diameters during batch machining of 18 microholes using known control methods. Noticeable is a significant variation in the results from −6 micrometer to +4 micrometer.

Figure 9:
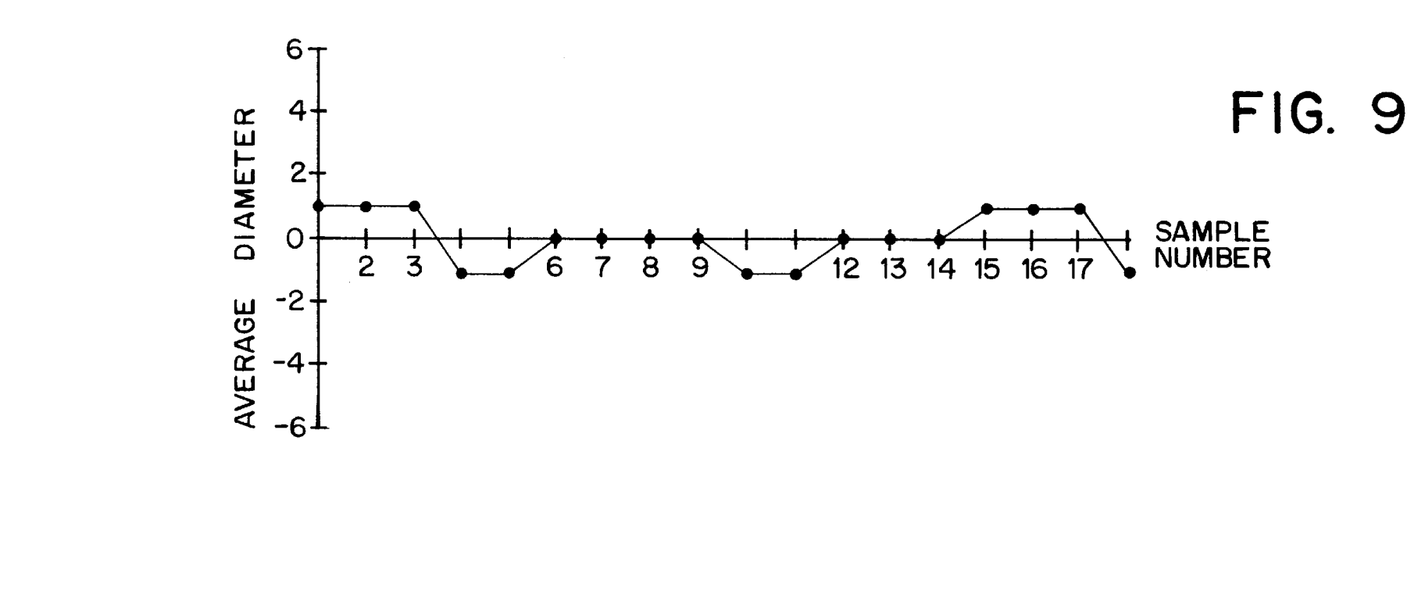
FIG. 9 is a representation of the distribution of initial hole diameters during batch machining of 18 microholes using control methods according to the invention.

FIG. 9 shows a representation of the distribution of initial hole diameters during batch machining of 18 microholes using an apparatus according to the invention. Noticeable is a marked improvement in the results. The remaining variations are caused by other factors which influence the process, and lie in the range of +/−1 micrometer.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for controlling a spark erosion process between a workpiece and an at least one electrode within an erosion interval during which at least one operating parameter exhibits a sudden change, called an erosion parameter changing interval, comprising the steps of:
   (a) measuring and recording values of at least one process parameter in at least one erosion interval preceding the erosion parameter changing interval, the preceding interval being called a measurement interval;
   (b) determining from the measured values of at least one process parameter at least one control value including a feed rate (Va) for the at least one electrode suitable for processing of the workpiece, the feed rate (Va) being determined from an average feed rate of the at least one electrode in the measurement interval; and
   (c) utilizing the determined feed rate (Va) as the at least one control value during the erosion parameter changing interval for controlling the spark erosion process.

2. The method according to claim 1, wherein the feed rate (Va) is smaller than an average feed rate in the measurement section.

3. The method according to claim 2, wherein the feed rate (Va) is determined from the average feed rate in the measurement section by multiplication with a coefficient (Ka) which is less than one.

4. The method according to claim 5, wherein the multiplication coefficient (Ka) is a function of the ratio of electrode diameter to thickness of the workpiece.

5. The method according to claim 1, wherein the at least one electrode in at least one erosion interval subsequent to a final measurement section, is moved at the determined feed rate (Va) at least during a time period, during which no short circuit occurs.

6. The method according to claim 1, further comprising the step of distinguishing between short circuits that are mechanical short circuits, and other short circuits, wherein the electrode movement for the mechanical short circuits is controlled differently from the movement for the other short circuits.

7. The method according to claim 6, wherein the distinction between the mechanical short circuits and the other short circuits is made on the basis of a short circuit voltage and a duration of the short circuit.

8. The method according to claim 7, wherein the duration of the short circuit is compared with a threshold value (Dkm) for the short circuit duration and the wherein the threshold value (Dkm) for the short circuit duration is a function of the ratio (electrode diameter)/(thickness of the workpiece).

9. The method according to claim 8, further comprising the step of moving the electrode backwards with constant velocity during the mechanical short circuits, and the electrode during the other short circuits is moving forward.

10. The method according to claim 9, wherein the constant velocity for moving the electrode backwards is greater than the feed rate.

11. The method according to claim 10, further comprising the steps of
   dividing at least one of a section to be eroded into two intervals
   using the first of the intervals for determining one or more control values for the spark erosion process in the second interval; and
   wherein the ratio between the first interval and the second interval is a function of a ratio (electrode diameter)/ (thickness of the workpiece).

12. The method according to claim 11, wherein the electrode is designed for microdrilling and diameter of the drilled hole is controlled via a feed rate (Vb), which, depending on the desired diameter for the drilled hole, is determined from the equation Vb=kd*Ni*kk*4/(pi*D*D), wherein

| | |
|---|---|
| Ni = | number of discharges per unit time |
| D = | desired hole diameter (= 2*sqrt(A/pi)) |
| A = | corresponding area (kd*Ni*kk/Vb) |
| kd = | removal coefficient = removed volume per discharge |
| kk = | effective coefficient = ratio of the number of short circuits to the number of discharges |
| pi = | 3.1415 . . . |
| sqrt = | square root |
| Vb = | feed rate. |

13. Apparatus for operating and controlling a spark erosion process between a workpiece and an electrode within an erosion interval during which at least one operating parameter exhibits a sudden change, called an erosion parameter changing interval, comprising
   drive and drive control means for the relative movement between the workpiece and the electrode;
   generator for generating erosion sparks;
   means for measuring values of process parameters;
   means for converting such measurement values into control values; and
   storage means, whereby
   a) the means for measuring values of process parameters record at least one process parameter in at least one erosion interval preceding the erosion parameter changing interval, said at least one process parameter comprises actual electrode feed rate values, said at least one erosion interval preceding the erosion parameter being called a measurement interval;

b) the means for converting said measurement values into control values establish one or more control values from measured values of at least one process parameter, said means for converting the measured values of the process parameters into control values are capable to distinguish between mechanical and other short circuits and said means for converting provide different control values and control signals, respectively, for mechanical short circuits than other short circuits;

c) the storage means store the control values so obtained; and d) the drive control means use said control values at least partially for control purposes in the erosion parameter changing interval.

14. The apparatus according to claim 13, wherein a) the means for measuring the values of process parameters measure values which are significant in the event of short circuits;

b) the means for converting measured values into control values are capable, based on the measured values of the process parameters, to distinguish between mechanical and other short circuits; and c) said converting means provide different control values and control signals, respectively, for mechanical short circuits than for other short circuits.

15. The apparatus according to claim 13, wherein the converting means further comprise:

a) storage means for storing established control values suitable for a desired machining of a workpiece;

b) data selection means for selecting one of the storage means;

c) switching means for controlling the data selection means; and d) means for evaluating short circuits which rate short circuits as important and mechanical, respectively, or as unimportant and others, respectively, so that in the event of mechanical short circuits the electrode is retracted via the switching means and the following data selection means with the reverse velocity (Vr), until the short circuit is no longer present.

16. The apparatus according to claim 15, wherein the means for evaluating short circuits store a pulse voltage in a register, compare the amplitude of said pulse voltage with a threshold value in a comparator, sum the duration of the short circuits are in a counter proportionate to a clock, and compare the short circuit duration so determined with a threshold value (Dkm) for the short circuit duration by means of a comparator and transmit corresponding control signals to the switching means.

17. The apparatus according to claim 15, wherein the established control values are feed rate (Va) and a reverse velocity (Vr).

18. The apparatus according to claim 15, wherein the at least one electrode is a micro drilling electrode.

* * * * *